United States Patent [19]
Follows

[11] 3,907,746
[45] Sept. 23, 1975

[54] STABILIZED POLYAMIDES

[75] Inventor: Gordon William Follows, Manchester, England

[73] Assignee: Imperial Chemical Industries, Inc., London, England

[22] Filed: July 5, 1974

[21] Appl. No.: 486,129

Related U.S. Application Data

[60] Division of Ser. No. 228,717, Feb. 23, 1972, Pat. No. 3,839,392, which is a continuation-in-part of Ser. No. 28,498, April 14, 1970, abandoned.

[52] U.S. Cl. . 260/45.95 R; 260/45.7 P; 260/45.7 R
[51] Int. Cl.² ............................................. C08G 6/00
[58] Field of Search ..... 260/45.8 N, 45.7 P, 45.9 R, 260/857, 45.75 R, 45.7 R, 45.95 R

[56] References Cited
UNITED STATES PATENTS

| | | | |
|---|---|---|---|
| 2,967,877 | 1/1961 | Groszos | 260/45.7 |
| 3,050,477 | 8/1962 | Gmitter et al. | 260/45.75 |
| 3,347,819 | 10/1967 | Meyer et al. | 260/45.75 |
| 3,413,260 | 11/1968 | Arrigo | 260/45.8 N |
| 3,415,776 | 12/1968 | Somers | 260/45.8 N |
| 3,652,493 | 3/1972 | Stewart | 260/45.7 |

*Primary Examiner*—V. P. Hoke
*Attorney, Agent, or Firm*—Robert J. Blanke

[57] ABSTRACT

Synthetic linear polyamides which are stabilized against the degradative effect of heat by the incorporation therein of certain hydrides of boron and silicon and derivatives thereof, optionally together with another antioxidant. These hydrides have a good pack life in the spinning process and provide polyamides having good spinning and knitting properties.

5 Claims, No Drawings

STABILIZED POLYAMIDES

This is a division, of application Ser. No. 228,717, filed Feb. 23, 1972 now U.S. Pat. No. 3,839,392.

This invention, which is a continuation-in-part application of copending application Ser. No. 28,498, filed Apr. 14, 1970, now abandoned relates to synthetic linear polyamides and to their stabilization against the degradative effects of high temperature.

By synthetic linear polyamides we mean condensation polymers which contain recurring amide groups as integral parts of the main polymer chain and which are obtained by the polycondensation of aminocarboxylic acids or the corresponding lactams or of mixtures of diamines with dicarboxylic acids, including interpolyamides obtained by the polycondensation of mixtures of different polyamide-forming components. More particularly, we mean the class of polyamides known generically as nylons of which polyhexamethylene adipamide and polycaprolactam are familar examples. Within this class are also included interpolyamides, for example that are obtained by the polycondensation of a mixture of hexamethylene diammonium adipate with caprolactam.

The nylons are eminently suitable for spinning, usually by a melt spinning technique, into filaments or fibres which are subsequently fashioned into textile articles for example yarns or knitted or woven fabrics. Nylon textiles are frequently subjected to operations involving exposure to high temperatures. For example, they may be heat set in order to stabilize the dimensions and shape of the article so that it is not distorted during subsequent processing. In particular nylon textiles, especially fabrics, which are to be dyed are heat set before dyeing in order to avoid distortion and creasing during the dyeing operation. Nylon fabrics, for example, are heat set on a stenter. Exposure of nylon textiles to heat, however, may result in some degradation of the polyamide. This degradation may manifest itself in a discolouration of the nylon textile so that a white material appears less white. The degradation may also manifest itself, however, in a modification of the dyeing properties of the nylon textile. The end groups of the polymer chains of the polyamide molecules of nylon are usually either carboxyl or amino groups. The proportions of these groups relative to each other and relative to the polymer as a whole influence the dyeing properties of the nylon textile. In particular the dyeing properties with anionic dyestuffs are influenced by the proportion of amine end groups, and the affinity for anionic dyestuffs is reduced if the proportion of amine end groups is reduced. It is well known that exposure of nylon textiles to high temperatures results in a reduction of the proportion of amine end groups, and causes a reduction in the affinity for anionic dyestuffs. However, in practice the effect is not obtained in a uniform manner, so that when fabrics which have been heat set are subsequently dyed with anionic dyestuffs, for example acid dyestuffs, it is frequently found that the fabric has a striped appearance due to portions of the fabric having dyed to a deeper shade than others. It is believed that these strips are caused by variations in the amine end group content of the polyamide forming the yarns from which the fabric is woven or knitted.

It has been proposed to stabilise polyamides against the degradative effects of high temperature by incorporating into the polyamide a stabilising system part at least of which consists of certain oxy acids of phosphorus or salts and esters thereof, but these phosphorus compounds have certain disadvantages, amongst which are poor pack lives in the spinning process and poor spinning and knitting properties of the resultant yarn.

We have found that heat stabilisation of polyamides may be achieved by the use of certain metallic and non-metallic hydrides and derivatives thereof, whereby the above-mentioned undesirable side-effects are minimised.

According to the present invention there are provided synthetic linear polyamides stabilised against the degradative effect of heat by the incorporation therein of a stabilising amount of a hydride selected from a. compounds of the formula

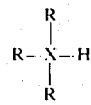

wherein each R independently represents a hydrogen atom or an alkyl, cycloalkyl, aralkyl or aryl group and X represents a silicon atom.

b. compounds of the formula

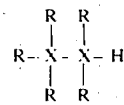

wherein R has the meaning stated above and X represents a boron atom or a silicon atom, c. compounds of the formula

wherein R has the meaning stated above and X represents a boron atom, d. compounds of the formula

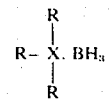

wherein R has the meaning stated above and X represents a nitrogen or a phosphorus atom and e. compounds of the formula

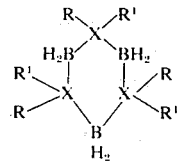

wherein R represents a hydrogen atom or an alkyl, cycloalkyl, aralkyl or aryl group, R' represents an alkyl, cycloalkyl, aralkyl or aryl group and X represents a nitrogen atom or a phosphorus atom.

By a stabilising amount we mean an amount sufficient to achieve a stabilising effect. We find that an amount of from 0.01% to 5.0% by weight of the hydride based on the weight of polyamide is usually sufficient, but it is preferred to use from 0.1% to 1.0% by weight.

As examples of the alkyl groups represented by R in the above formulae there may be mentioned methyl, ethyl, propyl, butyl, amyl, lauryl, and stearyl.

As examples of the cycloalkyl groups represented by R there may be mentioned cyclopentyl, cyclohexyl and methylcyclohexyl.

As an example of an aralkyl group represented by R there may be mentioned benzyl.

As examples of aryl groups represented by R there may be mentioned phenyl, naphthyl and tolyl.

Preferred stabilising hydride compounds for use in the present invention are those of class (e) defined above in which X represents a phosphorus atom. Particularly preferred are compounds within this class in which R' represents an alkyl group containing up to 18 carbon atoms and R represents a hydrogen atom or the group R'.

As specific examples of the hydrides which may be used as stabilisers for polyamides according to the present invention there may be mentioned diphenylsilane, triphenylsilane, P,P',P''-hexaamylcycloborophane, triethylamineborane, laurylamine borane, cetyldimethylamineborane, P,P',P''-tristearylcycloborophane and P,P',P''-triphenylcycloborophane.

The cyclic boron-phosphorus compounds (cycloborophanes) included in class (e) above are prepared from the corresponding primary or secondary phosphines via the borane adduct. The latter is usually obtained either by treatment of the phosphine with diborane or by reaction with sodium borohydride in a suitable inert solvent. Upon heating the adduct at 150°–200°C., cyclisation occurs with evolution of hydrogen and formation of the appropriate cycloborophane (see, for example, the Journal of the American Chemical Society, Volume 82, pages 2145–2148 (1960)).

The cyclic boron-nitrogen compounds (borazoles) are prepared in a similar manner to the above, in which a primary or secondary amine, as its hydrochloride, and sodium borohydride are heated at 50°–100°C. in an inert solvent such as diethyleneglycol dimethyl ether (see for example, the Journal of the American Chemical Society, Volume 85, pages 395–7 (1963)).

The hydrides may also be used in conjunction with other organic antioxidants which may be a substituted phenol.

The antioxidant will normally be added to the polymer-forming ingredients and subjected to the conditions prevailing during polymer formation and the resultant polyamide usually has to be melted after formation, so that the antioxidant must be stable under all the conditions which are likely to occur in practice.

With regard to substituted phenolic antioxidants not all phenols fulfil this condition but those that do may be used in the invention. Particularly suitable, however, are the so-called sterically hindered phenols. A particularly suitable class of sterically hindered phenols comprises those compounds which carry in the para or preferably the ortho position to the phenolic hydroxyl group a group which is attached to the phenol nucleus through a carbon atom of the said group which is a saturated carbon atom and is attached to at least two and preferably to three carbon atoms in addition to the carbon atom of the phenol nucleus. Examples of such groups are sec.-alkyl and especially tert.-alkyl groups, for example tert.-butyl groups, and cycloalkyl groups, especially cycloalkyl groups carrying an alkyl group on the carbon atom through which they are attached to the phenol nucleus, for example a 1-methyl-1-cyclohexyl group. Specific examples of suitable phenols are 2-α-methyloyolohexyl-4,6-dimethylphenol, bis-(2-hydroxy-3-α-methylcyclohexyl-5-methylphenyl)-methane, 1,1,3-tris-(2'-methyl-4'-hydroxy-5'-tert.-butylphenyl)butane, 1,1,5,5-tetrakis-(2'-methyl-4'-hydroxy-5'-tert.-butylphenyl)-pentane, 2,6-di-tert.-butyl-4-methyl-phenol, 1,2-bis(2'-hydroxy-3'-tert.-butyl-5'-methylphenyl)ethane, 1,1,5,5-tetrakis(2'-hydroxy-3'-tert.-butyl-5'-methylphenyl)pentane, bis-(2-hydroxy-3-tert.-butyl-5-ethylphenyl)methane and 2,6-di-tert.-butyl-4-diethyl-carbamoylthiomethyl-phenol. 1,1,3-Tris-(2'-methyl-4'-hydroxy-5'-tert.-butylphenyl)butane and 1,1,5,5-tetrakis-(2'-methyl-4'-hydroxy-5'-tert.-butylphenyl)pentane are particularly suitable.

The stabilising amount of such phenols incorporated with the polyamide to ensure adequate stability may fall within the range of from 0.01% to 10% by weight of the polyamide but is preferably within the range of from 0.02% to 2% by weight.

Other phenols which may be used as antioxidants are those which are substituted in the aromatic nucleus by a hydrocarbon radical and which contain in addition a carboxyl group or a group derived from a carboxyl group.

By a group derived from a carboxyl group we mean a group characterising a functional derivative of a carboxylic acid. Such groups include in particular carboxylic ester groups, carbamyl groups (including N-substituted carbamyl groups) and cyano groups. The term carboxyl group includes salts of carboxyl groups whether inorganic salts or salts with organic bases.

The hydrocarbon radical is preferably situated in one of the ortho positions to the phenolic hydroxyl group and particularly suitable hydrocarbon radicals are those defined above in connection with phenolic antioxidants which do not contain a carboxy group.

The carboxy group, or the group derived from a carboxyl group, which is another of the characteristics of the stabilising compounds used in our invention, may be directly attached to the phenolic nucleus. However, we prefer it to be separated from the phenolic nucleus by one or more atoms, which are preferably, but not necessarily, all carbon atoms. Particularly suitable bivalent radicals for linking the carboxyl group or derived group to the phenolic nucleus are alkylene radicals, especially those having a small number of carbon atoms, for example methylene, ethylene and propylene radicals.

In addition to the hydrocarbon radical and carboxyl group or derived group, the phenols may be substituted by other groups. However, it is undesirable for there to be present any group which would cause the phenol to decompose in the polyamide when molten, and this limits the kind of substituents which may be present. There may, however, be present in the phenolic antioxidant more than one hydrocarbon radical, and more than one carboxyl group or derived group. Alkoxy groups may also be present.

The carboxy group-containing phenols which may be used in the present invention include bis-phenols which are substituted in at least one of the phenolic nuclei by a hydrocarbon radical and which contain at least one carboxyl group or derived group. By a bis-phenol we mean a compound the molecule of which consists of two phenol molecules, the same or different, linked together, either directly or through an intermediate bivalent linking radical. As examples of linking radicals there may be mentioned alkylene, sulphide and sulphone. The carboxyl group or derived group which is present in the phenol may form a part of the linking radical.

A particularly valuable class of phenols which contain a hydrocarbon radical and in addition a carboxyl group or a group derived therefrom and which may be used in our invention is that which may be represented by the general formula

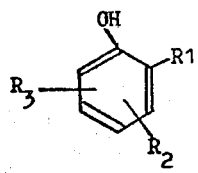

in which $R_1$ represents a tertiary alkyl group, an aralkyl group or cycloalkyl group, $R_2$ represents an alkyl, cycloalkyl, aryl, aralkyl or alkoxy group or a group — A — X in which A represents a direct link or an alkylene radical and X represents a carboxyl, carbamyl, carboxylic ester or cyano group, and $R_3$ represents the group — A — X having the same significance as above or, when $R_2$ is not — A— X, may represent the group

where A represents an alkylene radical and X and $X^1$ represent carboxyl, carbamyl, carboxylic ester or cyano groups and may be the same or different. The tertiary alkyl groups in the above formula preferably contain from 4 to 12 carbon atoms, the alkyl, alkylene and alkoxy groups from 1 to 12 carbon atoms, and the cycloalkyl, aralkyl and aryl groups up to 12 carbon atoms. As specific examples of tertiary alkyl groups there may be mentioned tert.-butyl, tert.-amyl, tert.-octyl and tert.-nonyl groups. As specific examples of alkyl groups there may be mentioned methyl, ethyl, propyl, butyl, hexyl, octyl, decyl and dodecyl groups. As specific examples of alkylene groups there may be mentioned methylene, ethylene, propylene, hexamethylene, octamethylene and dodecamethylene. As specific examples of alkoxy groups there may be mentioned methoxy and ethoxy. As specific examples of cycloalkyl groups there may be mentioned cyclopentyl, cyclohexyl and methylcyclohexyl. As specific examples of aralkyl groups there may be mentioned benzyl and phenylethyl. As specific examples of aryl groups there may be mentioned phenyl, tolyl, xylyl and naphthyl. As specific examples of carbamyl groups there may be mentioned carbamyl, N-methylcarbamyl and N,N-diethylcarbamyl. As specific examples of carboxylic ester groups there may be mentioned carbomethoxy and carboethoxy.

As specific examples of phenols containing carboxy groups or groups derived from carboxy groups which may be used in our invention there may be mentioned β-(4-hydroxy-3α-methylcyclohexyl-5-methylphenyl)-propionic acid, β-(4-hydroxy-3,5-di-tert.-butylphenyl)-propionic acid, 4-hydroxy-3,5-di-tert.-butylphenylacetamide, 2-(4'-hydroxy-3',5'-di-tert.-butylphenyl)butane-1,4-dicarboxylic acid, hexamethylenediammonium 1-(4'-hydroxy-3',5'-di-tert.-butylphenyl)pentane-2,5-dicarboxylate, β-(2-hydroxy-3-tert.-butyl-5-methoxyphenyl)propionic acid, ethyl 4-hydroxy-3,5-di-tert.-butylbenzoate, β,β-bis(4-hydroxy-3,5-di-tert.-butyl-phenyl butyric acid and 3,3-methylene bis (4-hydroxy-5-tert.-butyl hydrocinnamic acid.

The phenols containing carboxy groups or groups derived therefrom and which may be used in our invention may be prepared by methods generally known to the art; for example phenol may be condensed with olefinically unsaturated carboxylic acids or their derivatives or with keto acids or their derivatives, and the products alkylated by reaction with an olefine.

The amount of phenol of the above defined structure which is to stabilise polyamides according to our invention may vary widely from as little as 0.01% to as much as 5% or more expressed as percent by weight of the weight of the polyamide. The amount of such phenol which may be added, however, depends to some extent on the nature of the phenol. It is believed that in many instances the phenol, being a carboxylic acid or a functional derivative of a carboxylic acid, takes part in the polycondensation reaction leading to formation of the polyamide, particularly in those cases in which the phenol is added to the polyamide-forming ingredients or during the polycondensation. Where the phenol contains a single carboxyl group or a derived group which is sufficiently labile for it to take part in the polycondensation reaction, for example a carboxylic ester group, the phenol may act as a 'chain-stopper' in the polycondensation reaction, that is to say it acts to limit the degree of polycondensation and hence to limit the viscosity of the derived polymer. In this case, depending on the degree of polycondensation required, the amount of phenol may have to be limited. Normally however, amounts up to 0.5% by weight of the polyamide are permissible. Where the phenol contains two carboxylic groups, or derived groups which can take part in the polycondensation reaction, it does not function as a 'chain-stopper' and larger amounts, up to 5% by weight of the polyamide or more, may be added without the degree of polycondensation. Where, however, the polyamide obtained by polycondensation of a diamine with a dicarboxylic and the phenol is itself a dicarboxylic acid, or a functional derivative thereof which can take part in the polycondensation reaction, it is desirable to keep the proportion of total diamine and total dicarboxlic acid (including the functional derivative in approximate stoichiometric balance by having present an amount of diamine stoichiometrically equivalent to the phenol as well an amount equivalent to the dicarboxylic acid forming the major acid constituent of the polyamide.

The substituted diphenylamines which may be used as antioxidants in the present invention are diphenylamines which are substituted in each of the positions para to the amino group alkyl, cycloalkyl or aralkyl group.

Preferred substituted diphenylamines are those having general formula

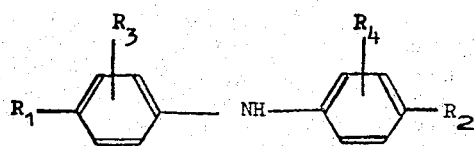

in which $R_1$ and $R_2$ represent alkyl, cycloalkyl, or aralkyl group having up to 12 carbon atoms, and may be the same or different. $R_3$ and $R_4$ represent hydrogen atoms, or alkyl, cycloalkyl or aryl groups having up to 12 carbon atoms, and may be the same or different. We particularly prefer that the groups represented by $R_1$ and groups which are joined to the diphenylamine residue through a carbon atom of the group which is a saturated tertiary carbon. As examples of such groups there may be mentioned t-butyl, t-octyl (1,1,3,3,-tetramethylbutyl), α,α-dimethylbenzyl and α-methylcyclohexyl. As examples of other alkyl, cycloalkyl and aralkyl groups which $R_1$ and $R_2$ may represent there may be mentioned methyl, ethyl n-propyl, isopropyl, n-butyl, sec.-butyl, iso-butyl, amyl, hexyl, octyl, decyl, dodecyl, cyclopentyl, cyclohexyl, methyl cyclopentyl, methylcyclohexyl, benzyl, α-methylbenzyl and phenylethyl. The groups represented by $R_3$ and $R_4$ are preferably hydrogen atoms or lower alkyl groups, that is alkyl groups having from 1 to 4 carbon atoms, but may be any of the groups which $R_1$ and $R_2$ may represent. As specific examples of the substituted diphenylamines there may be mentioned 4,4'-bis(1,1,3,3,-tetramethylbutyl)diphenylamine, 2,2'-dimethyl-4,4'-di-t-butyl diphenylamine, 3,3'-dimethyl-4,4'-di-(1,1,3,3,-tetramethylbutyl)diphenylamine, 4,4'-bis-(α,α-dimethylbenzyl)diphenylamine, 2,2'-di(α-methyl benzyl)-4,4'-di-t-butyldiphenylamine and 4,4'-di-(α-methylcyclohexyl)diphenylamine.

The substituted diphenylamine may be used in amounts of up to 5% weight of the polyamide but preferred amounts range from 0.02 to 2%.

According to a further feature of the invention there is provided a process for the manufacture of synthetic linear polyamides stabilised against the degradative effect of heat which comprises heating, so as to effect polycondensation, ingredients which give rise to the said polyamide by polycondensation and which is characterised in that there is added to the said ingredients, to the said polyamide or to the polycondensation reaction mixture during polycondensation a stabilising amount of a hydride as hereinbefore defined optionally together with an organic antioxidant as hereinbefore defined.

The general conditions for effecting the polycondensation reaction of our invention are well known to the art and detailed description is unnecessary. In general, the polyamide-forming ingredients are heated until the desired degree of polycondensation is achieved. In the case of aminocarboxylic acids, or of mixtures of, or salts, of diamines with di-carboxylic acids, water is formed in the polycondensation reaction and provision must be made for its removal. It may be convenient to start with the ingredients in the form of an aqueous solution. It may be advantageous to carry out the polycondensation in an atmosphere of an non-oxidising gas, for example nitrogen, and in an autoclave under pressure with provision for removing water from the reaction mixture by bleeding off as steam. The temperature of the reaction mixture is usually raised gradually to that required to effect the desired degree of polycondensation, which temperature may be within the range 250° to 300°C. The hydride, and if desired, the organic antioxidant may be added to the finished polyamide but we prefer to add them either during the polycondensation reaction or more especially to the polyamide-forming ingredients before polycondensation commences.

Other additions may be made to the polyamide-forming ingredients or during the polycondensation reaction. Thus there may be added viscosity stabilisers, for example acetic acid, pigments or light stabilisers, for example manganese salts. Where titanium dioxide is used it can be coated with a manganese compound.

The invention is illustrated but not limited by the following Examples in which parts and percentages are by weight.

In the Examples the b-chromaticity is the ratio of the % reflected blue light to the sum of the % reflected blue, green and red light and is similar to the z trichromatic coefficient of the International Commission on Illumination System (Handbook of Colorimetry, A. C. Hardy, The Techology Press, Cambridge, Mass., U.S.A.).

Example 1

5240 parts of nylon 66 salt (hexamethylene diammonium adipate), 2500 parts of distilled water, 22.7 parts of 26.4% acetic acid, 15.5 parts of a 60% (w/w) aqueous solution of hexamethylene daimine, 2.26 parts of 1,1,3-tris(2'-methyl-4'-hydroxy 5'-t-butylphenyl)butane and 5.24 parts of triphenylsilane were heated in an autoclave to a temperature of about 215°C. and a pressure of 250 lbs. per square inch. The heating was continued and pressure maintained at 250 lbs. p.s.i. by bleeding off steam. At a temperature of 220°C., 226 parts of a 40% aqueous dispersion of titanium dioxide in water was added via a lock. When a temperature of 240°C. was reached, the pressure was gradually reduced to atmospheric during 60 minutes after which time the temperature had risen to about 270°C. As soon as atmospheric pressure was reached a slow stream of nitrogen was passed through the autoclave. After 10 minutes agitation, the polymer was extruded from the autoclave under nitrogen pressure as a ribbon and quenched with water. The polymer ribbon was then chipped. The polymer chips were melted and spun at 290°C. into a yarn of 9 filaments. Four strands were plied together and drawn and twisted to a total denier of 108.

Yarn was also spun in the same way from polymer chip made without any addition of 1,1,3-tris(2'-methyl-4'-hydroxy 5'-t-butylphenyl)butane or triphenylsilane.

The yarns were heated in air at 220°C. for 27 seconds. The b-chromaticity of the yarn was measured before and after heating using a Colourmaster Mark V colourmeter. The amine end group concentration in the yarn was determined before and after heating by titration of a solution in phenol and methanol with N/20 hydrochloric acid.

Similar preparations were carried out in which the 5.24 parts of triphenylsilane were replaced by 10.48 parts of diphenylsilane, 12 parts of P,P',P''-hexaamylcycloborophane and 24 parts of triethylamineborane respectively.

The results of comparative tests on these various yarns are given in the table below:

| Additive | 'b' chromaticity Before test | After test | Loss | Percentage loss of Amine end groups |
| --- | --- | --- | --- | --- |
| None | 0.3204 | 0.2738 | 0.0466 | 50.3 |
| 5.24 Parts triphenyl silane + 2.26 parts of TMHBPB. | 0.3183 | 0.2827 | 0.0356 | 48.6 |
| 10.43 Parts diphenylsilane + 2.26 parts of TMHBPB. | 0.3161 | 0.2763 | 0.0398 | 48.3 |
| 12 Parts P,P', P'' hexa-amylcyclo-borophane + 2.26 parts of TMHBPB | 0.3133 | 0.2963 | 0.0170 | 37.7 |
| 24 Parts triethyl-amineborane + 2.26 parts of TMHBPB | 0.3108 | 0.2760 | 0.0348 | 47.1 |

*TMHBPB - 1,1,3-tris(2'-methyl-4'-hydroxy-5'-t-butylphenyl)butane.

Example 2 a. 5,240 Parts of nylon 66 salt (hexamethylene diammonium adipate), 2,500 parts of distilled water, 22.7 parts of 26.4% acetic acid solution and 15.5 parts of a 60% (w/w) aqueous solution of hexamethylene diamine were heated in an autoclave to a temperature of about 215°C. and a pressure of 250 lbs. per square inch. The heating was continued and the pressure maintained at 250 lbs./square inch by bleeding off steam. At a temperature of 220°C., 226 parts of a 40% aqueous dispersion of titanium dioxide in water was added via a lock. When a temperature of 240°C. was reached, the pressure was gradually reduced to atmospheric during 60 minutes after which time the temperature had risen to about 270°C. As soon as atmospheric pressure was reached, the polymer was extruded under slight nitrogen pressure as a ribbon, quenched with water and chipped.

b. 60 Parts of the polymer chips prepared as described above, were stirred slowly under a slow stream of nitrogen, in the presence of 0.552 parts of laurylamineborane, at 300°C. for 20 minutes. After cooling, the polymer was broken into small pieces and converted into yarn in a similar manner to that described in Example 1.

c. 60 Parts of the polymer chips prepared as described in paragraph (a) above were treated as described in paragraph (b) but replacing the 0.552 part of laurylaminoborane by 0.786 parts of cetyldimethylamineborane.

d. 60 Parts of the polymer chips prepared as described in paragraph (a) above were treated as described in paragraph (b) except that the 0.552 part of laurylaminoborane were omitted.

The samples of yarn obtained as described in paragraphs (b), (c) and (d) were evaluated for b chromaticity and amine end group has been described in Example 1. The results are given below:

Example 3 a. 5240 parts of nylon 6.6 salt (hexamethylene diammonium adipate), 2500 parts of distilled water, 22.7 parts of 26.4% acetic acid and 15.5 parts of a 60% (w/w) aqueous solution of hexamethylenediamine were heated in an autoclave to a temperature of about 215°C and a pressure of 250 lbs. per square inch. The heating was continued and pressure maintained at 250 lbs. p.s.i. by bleeding off steam. At a temperature of 220°C., 226 parts of a 40% aqueous dispersion of titanium dioxide in water were added via a lock. When a temperature of 240°C was reached, the pressure was gradually reduced to atmospheric during 60 minutes after which time the temperature had risen to about 270°C. As soon as atmospheric pressure was reached, the polymer was extruded under slight nitrogen pressure as a ribbon, quenched with water and chipped.

Analysis of the polymer chip showed it to contain 66.6 Amine End Groups per $10^6$ gm. polymer and 106.7 Carboxyl End Groups per $10^6$ gm. polymer.

b. 60 parts of polymer chips prepared as described above, were stirred slowly under a stream of nitrogen at 300°C for 20 minutes. After cooling, the polymer was broken into small pieces and converted to yarn in a similar manner to that described in Example 1 of the above specification.

c. 60 parts of the polymer chips prepared as described in paragraph (a) above plus 0.06 parts of 1,1,3-tris(2'-methyl-4'-hydroxy 5'-t-butylphenyl) butane were treated as described in paragraph (b).

d. 60 parts of the polymer chips prepared as described in paragraph (a) above plus 0.06 parts β - (3',5'-di-t-butyl 4'-hydroxyphenyl) propionic acid were treated as described in paragraph (b).

e. 60 parts of the polymer chips prepared as described in paragraph (a) above plus 0.3 parts triphenylsilane were treated as described in paragraph (b).

f. 60 parts of the polymer chips prepared as described in paragraph (a) above plus 0.3 parts triphenylsilane and 0.06 parts 1,1,3-tris(2'-methyl-4'-hydroxy 5'-t-butylphenyl) butane were treated as described in paragraph (b).

| Example No. | Additive | b chromaticity Before test | After test | Loss | % loss of Amine end groups |
| --- | --- | --- | --- | --- | --- |
| 2b | 0.552 parts lauryl-amineborane | 0.3182 | 0.2903 | 0.0279 | 42.2 |
| 2c | 0.786 parts cetyl dimethylamine borane | 0.3247 | 0.2996 | 0.0251 | 49.7 |
| 2d | None | 0.3186 | 0.2854 | 0.0332 | 52.0 | g. 60 parts of the polymer chips prepared as described in paragraph (a) above plus 0.3 parts triphenylsilane and 0.06 parts β - (3',5'-di-t-butyl 4'-hydroxyphenyl) propionic acid were treated as described in paragraph (b).

h. 60 parts of the polymer chips prepared as described in paragraph (a) above plus 0.3 parts P,P',P''-triphenylcycloborophane were treated as described in paragraph (b).

i. 60 parts of the polymer chips prepared as described in paragraph (a) above plus 0.3 parts P,P',P''-triphenylcycloborophane and 0.06 parts 1,1,3-tri(2'-methyl 4'-hydroxy 5'-t-butylphenyl) butane were treated as described in paragraph (b).

j. 60 parts of the polymer chips prepared as described in paragraph (a) above plus 0.3 parts P,P',P''-triphenylcycloborophane and 0.06 parts β - (3',5'-di-t-butyl 4'-hydroxyphenyl) propionic acid were treated as described in paragraph (b).

k. 60 parts of the polymer chips prepared as described in paragraph (a) above plus 0.3 parts ethylene diamine diborane were treated as described in paragraph (b).

l. 60 parts of the polymer chips prepared as described in paragraph (a) above plus 0.3 parts ethylene diamine diborane and 0.06 parts 1,1,3-tris-(2'-methyl 4'-hydroxy 5'-t-butylphenyl) butane were treated as described in paragraph (b).

m. 60 parts of the polymer chips prepared as described in paragraph (a) above plus 0.3 parts ethylene diamine diborane and 0.06 parts β -(3',5'-di-t-butyl 4'hydroxyphenyl) propionic acid were treated as described in paragraph (b).

The yarns obtained as described in paragraph (b)-(m) were heated in air at 220°C for 27 seconds. The b chromaticity of the yarn was measured before and after heating using a Colourmaster Mark V colorimeter. The amine end group concentration of the yarn was determined before and after heating by titration of a solution in phenol and methanol with $N/_{20}$ hydrochloric acid.

The results of comparative tests on these various yarns are given in the table below:

| Ex. No. | Additive(s) | 'b' Chromaticity Before Test | 'b' Chromaticity After Test | Loss | Loss Amine End Groups |
|---|---|---|---|---|---|
| (b) | Nil | 0.319 | 0.268 | 0.051 | 51.2 |
| (c) | 0.06 parts 1,1,3-tris (2'methyl 4'hydroxy 5-t-butylphenyl)butane | 0.319 | 0.278 | 0.041 | 50.3 |
| (d) | 0.06 parts β-(3',5'-di-t-butyl 4'hydroxyphenyl) propionic acid) | 0.321 | 0.281 | 0.040 | 48.3 |
| (e) | 0.3 parts triphenyl silane | 0.323 | 0.276 | 0.047 | 51.0 |
| (f) | 0.3 parts triphenyl silane 0.06 parts 1,1,3-tris (2'methyl 4'hydroxy 5'-t-butylphenyl) butane | 0.322 | 0.286 | 0.036 | 49.4 |
| (g) | 0.3 parts triphenyl silane 0.06 parts β-(3'5'-di-t-butyl 4'hydroxyphenyl) propionic acid | 0.324 | 0.288 | 0.036 | 47.7 |
| (h) | 0.3 parts P,P',P''-triphenyl-cycloborophane | 0.328 | 0.291 | 0.037 | 46.9 |
| (i) | 0.3 parts P,P',P''-triphenyl-cycloborophane 0.06 parts 1,1,3-tris(2'methyl 4'hydroxy 5'-t-butylphenyl) butane | 0.328 | 0.299 | 0.029 | 42.6 |
| (j) | 0.3 parts P,P',P''-triphenyl cycloborophane 0.06 parts β-(3',5'-di-t-butyl 4'hydroxyphenyl) propionic acid | 0.327 | 0.303 | 0.024 | 39.6 |
| (k) | 0.3 parts ethylenediamine diborane | 0.317 | 0.274 | 0.043 | 41.8 |
| (l) | 0.3 parts ethylenediamine diborane 0.06 parts 1,1,3-tris(2'methyl 4'hydroxy 5'-t-butylphenyl) butane | 0.316 | 0.277 | 0.039 | 33.2 |
| (m) | 0.3 parts ethylene diamine diborane 0.06 parts β-(3',5'-di-t-butyl 4'hydroxyphenyl) propionic acid | 0.317 | 0.279 | 0.038 | 27.7 |

Having thus disclosed the invention, what is claimed is:

1. A heat-stabilized polyamide composition comprising a synthetic linear polyamide having re-occuring amide groups as integral parts of the main chain, and stabilizing amounts of a hydride selected from
   a. compounds of the formula:

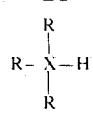

wherein each R independently represents a hydrogen atom or an alkyl, cycloalkyl, aralkyl or aryl group and X represents a silicon atom;

b. compounds of the formula:

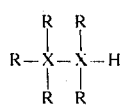

wherein R has the meaning stated above and X represents a boron atom or a silicon atom; and c. compounds of the formula:

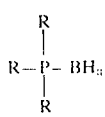

wherein R has the meaning stated above.

2. Synthetic linear polyamides as claimed in claim 1 wherein the amount of stabilizing hydride incorporated into the polyamide is from 0.01% to 5.0% by weight calculated on the weight of the polyamide.

3. Synthetic linear polyamides as claimed in claim 1 wherein the stabilizing hydride is used in conjunction with a phenolic stabilizer which carries a tertiary alkyl group in the ortho or para position to the phenolic hydroxyl group.

4. Synthetic linear polyamides as claimed in claim 3 wherein the phenolic stabilizer is 1,1,3,-tris(2'-methyl-4'-hydroxyl-5'-tert-butylphenyl) butane or 1,1,5,5-tetrakis(2'-methyl-4'-hydroxyl-5'-tert-butyl phenyl)-pentane.

5. Synthetic linear polyamides as claimed in claim 3 wherein the amount of phenolic stabilizer incorporated into the polyamide is from 0.1% to 10% calculated on the weight of the polyamide.

* * * * *